United States Patent [19]

Pincus

[11] 3,875,613
[45] Apr. 8, 1975

[54] CONVEYOR APPARATUS FOR HANDLING EMULSIFIED MEAT PRODUCTS

[75] Inventor: Nathaniel Pincus, New Hope, Pa.

[73] Assignee: Bernard S. Pincus Company, Philadelphia, Pa.

[22] Filed: Mar. 6, 1972

[21] Appl. No.: 232,050

[52] U.S. Cl. .................................. 17/24; 198/1
[51] Int. Cl. ................................... A22b 7/00
[58] Field of Search .............................. 198/230, 1; 17/32–35, 24; 241/3; 425/377

[56] References Cited
UNITED STATES PATENTS

| | | | |
|---|---|---|---|
| 530,582 | 12/1894 | Duhrkop | 17/32 UX |
| 1,022,305 | 4/1912 | Dean | 17/35 X |
| 1,973,095 | 9/1934 | Muller | 198/230 |
| 2,859,864 | 11/1958 | Ibaugh et al. | 198/230 X |
| 3,351,173 | 11/1967 | Nelson et al. | 198/1 |
| 3,530,531 | 9/1970 | Posegate | 17/35 X |
| 3,537,129 | 11/1970 | Orloff et al. | 17/35 |

Primary Examiner—Hugh R. Chamblee
Attorney, Agent, or Firm—Edelson and Udell

[57] ABSTRACT

Apparatus for and method of conveying emulsified meat for the production of sausages and the like. Meat solids, ground and blended with spices and curing liquid, are emulsified in and extruded from an emulsifier unit in the form of a relatively small diameter continuous length of a paste-like product which is discharged onto and conveyed by a belt conveyor to a storage vessel for stuffing into sausage casings. The conveyor belt receives and moves the paste-like extrusion along a restricted portion of the belt located centrally between its opposite side edges and without any spread of meat over and around said side edges which would be difficult to remove. The extrusion being unconfined except for its contact with the conveying belt is not subjected to any frictional resistance in moving to the point of its discharge and thus is transferred from the emulsifier without any rise in temperature due to kinetic friction and with little, if any, "smearing" of the meat. The apparatus includes releasable scraper means at the discharge end of the belt to prevent width-wise spread of the meat over the conveying surface of the return run of the belt to thereby maintain it completely free and clear of any adhering accumulation of meat.

6 Claims, 8 Drawing Figures

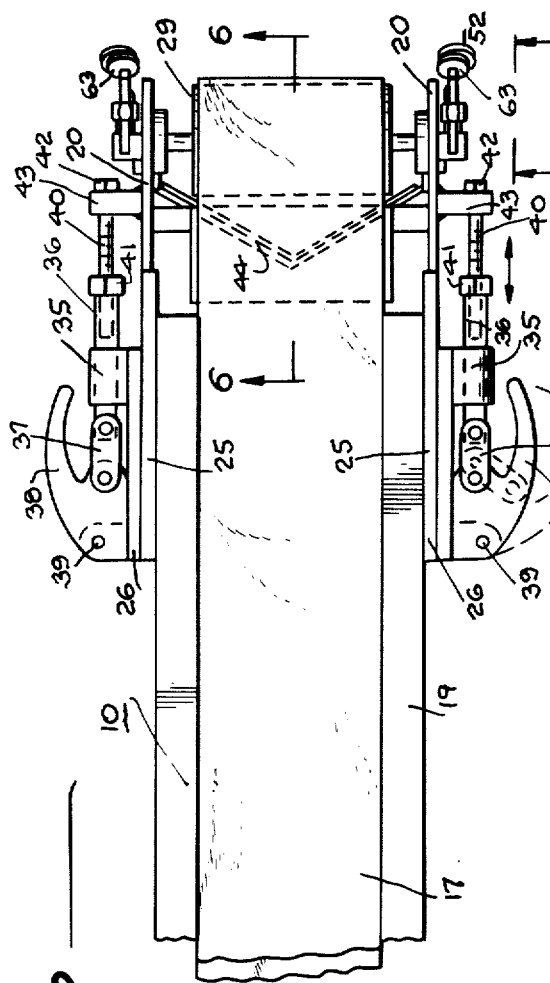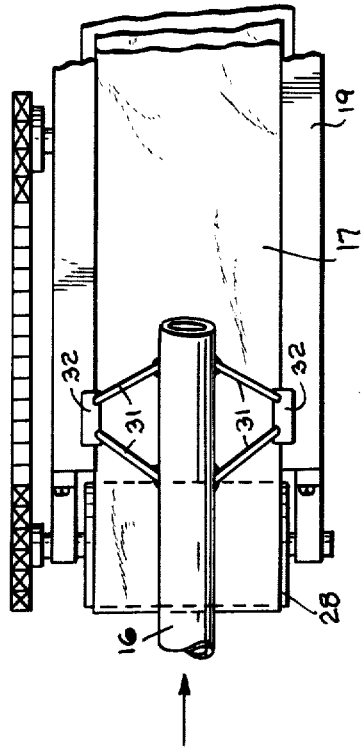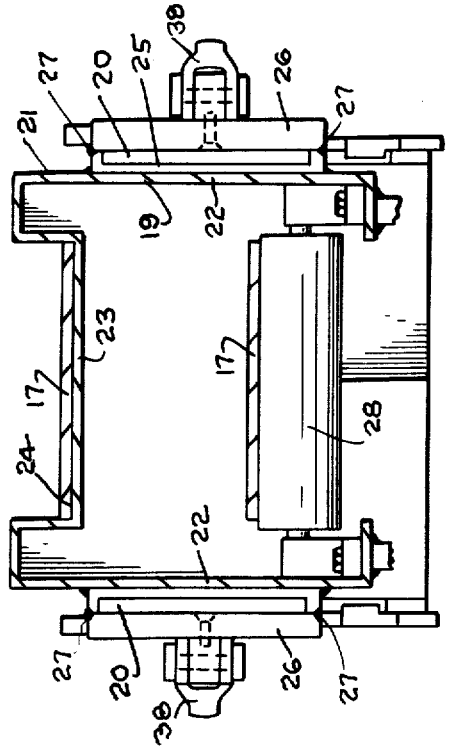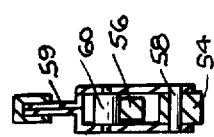

CONVEYOR APPARATUS FOR HANDLING EMULSIFIED MEAT PRODUCTS

This invention generally relates to conveying apparatus and more particularly to a new and improved apparatus for and method of conveying emulsified meat from an emulsifier unit to a storage vessel from whence the meat is pumped or otherwise withdrawn for further processing, such as to form sausages and the like.

In the production of sausages and like encased meat products, the material stuffed into its casing is in the form of solid meat solids which is initially run through a grinder wherein it is ground to small particle size, then through a blender in which moisture, spices and curing liquids are added to the ground meat and finally through an emulsifier wherein the blended mixture is reduced to a paste-like emulsion. This meat emulsion is then conventionally pumped by the emulsifier through a closed conduit to the storage vessel from whence the emulsified meat is delivered to the stuffing machine.

Due to friction resistance to passage of the emulsified meat through the conveying pipe, the temperature of the meat is elevated some 8° to 10°F. and since it is required that the temperature of the meat at the stuffing machine be no higher than 60° to 65°F., it is necessary to use sufficient ice water in the blender not only to reduce the temperature of the meat discharged from the emulsifier but also to overcome the additional rise in temperature due to the kinetic friction of the meat passing through the conveying pipe.

Another serious disadvantage of pumping the emulsified meat through a conduit is that due to the frictional resistance encountered by the meat passing through the conveying pipe as aforesaid a back pressure is developed in the emulsifier unit which not only reduces the effectiveness of the emulsifier to sharply communite the meat to its finely particled emulsified condition, but also results in undesired breaking down of the meat fats into an oily state, known in the industry as "smearing" of the meat fats. This "smearing" occurs not only in the emulsifier due to back pressure developed therein by the frictional resistance to passage of the emulsifier through a confined conveying tube, but also in the conveying tube itself due to the frictional resistance which it imposes on the meat moving through the tube. This "smearing" results in loss of good color in the finished product, which color loss becomes nitoceable after the emulsified meat stuffed into its casings is smoked and cooked in the smoke house.

In addition, use of a relatively long tube or other such meat-confining conduit for transfer of the emulsified to a more or less remotely located station for further processing of the meat product, such as the station where the meat is collected for stuffing into sausage casings, slows up considerably the speed of transfer of the emulsified meat to its storage vessel, this being also a consequence of using a confined conduit for such transfer with its attending frictional resistance.

Having in mind the foregoing, it is among the principal objects of the present invention to provide an apparatus for and method of so conveying the emulsified meat from the emulsifier to the storage vessel at the stuffing station as to largely prevent the above mentioned "smearing" of the meat and at the same time convey the meat to the stuffing station substantially in its condition and at its temperature existing just at it is discharged from the emulfisier unit, with resultant saving in cost of icing the meat to compensate for the above mentioned rise in temperature occasioned by the frictional resistance of the meat passing through a closed conduit.

Still another object of the invention is to provide an apparatus for and method of transferring the emulsified meat to its storage vessel which does not impose any frictional resistance to such transfer and which accordingly very considerably reduces the time for conveying a given batch of the emulsified meat to the stuffing station. It has been found that by use of the apparatus and method of the present invention versus use of the conventionally employed conveying tube saves as much as fifty percent of the usual conveying time. Since the speed of conveying the emulsified meat in accordance with the present invention is independent of the discharge speed of the emulsifier unit, by varying the operating speed of the apparatus of the present invention, an increased volume of the emulsified meat may be handled within a given time as compared with that conveyed through the conventionally employed conveying tube.

A further object of the present invention is to provide an apparatus for and method of conveying the emulsified meat to the stuffing station which is easy to maintain and keep clean.

Other objects and advantages of the present invention will be apparent from the detailed specification which follows, it being understood that the invention consists in the combination, construction, location and relative arrangement of parts, as well as in the improved method for the transference of emulsified meat to a storage tank from which it is delivered for subsequent processing into the form of sausage, all as described more fully hereinafter, as shown in the accompanying drawings and as finally pointed out in the appended claims.

In the accompanying drawings:

FIG. 2 is a plan view of the conveyor mechanism as taken on the line 2—2 of FIG. 1;

FIG. 3 is a transverse sectional view of the conveyor mechanism as taken on the line 3—3 of FIG. 1;

FIG. 4 is a side elevational of the discharge end of the conveyor mechanism as viewed from the line 4—4 of FIG. 2;

FIG. 5 is a detail sectional view of one side of the conveyor as taken on the line 5—5 of FIG. 4;

Figure 1:
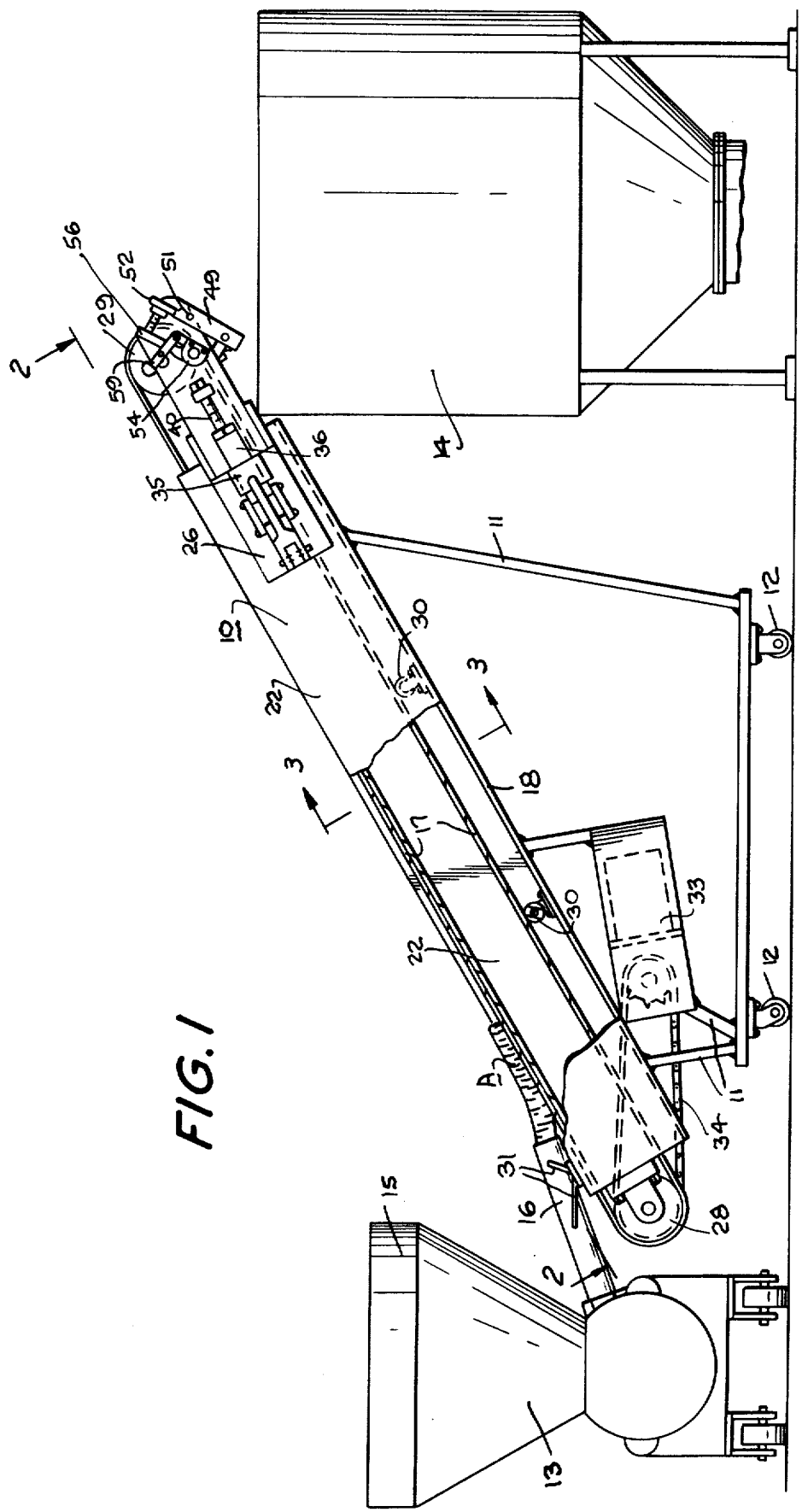
FIG. 1 is a side elevational view showing the conveyor mechanism of the present invention operatively positioned in relation to the meat emulsifier and the storage tank into which the emulsified meat is deposited by way of the conveyor mechanism.
Figure 6:
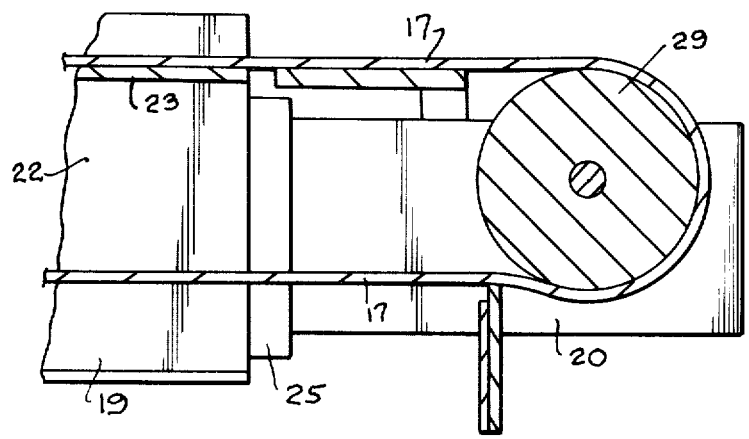
FIG. 6 is a vertical sectional of the discharge end of the conveyor as taken on the line 6—6 of FIG. 2.
Figure 7:
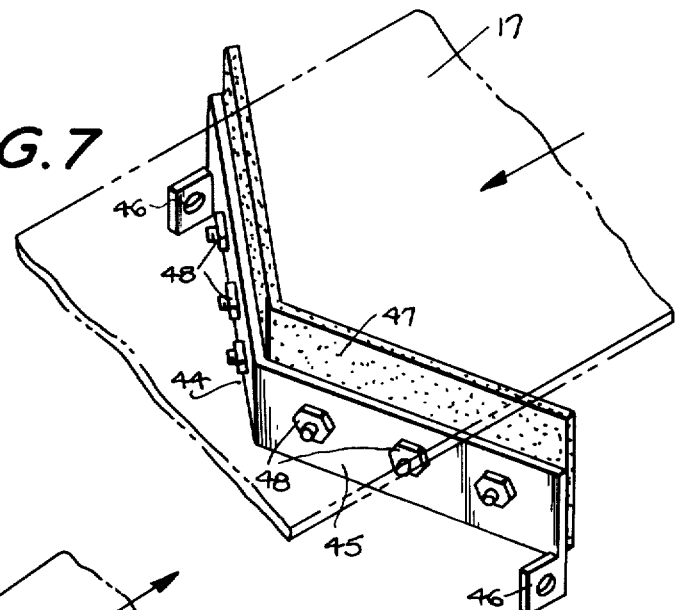
FIG. 7 is a perspective view of the scraper which underlies the return of the conveyor belt adjacent the discharge end of the conveyor.
Figure 8:
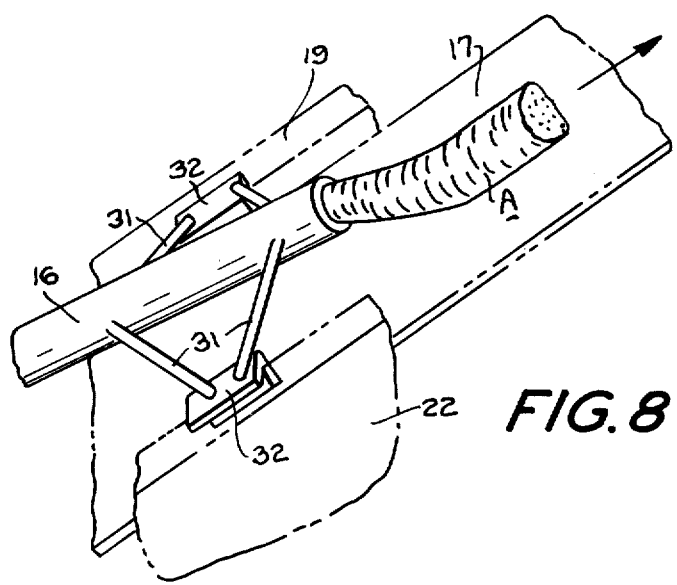
FIG. 8 is perspective view showing deposit of the emulsified meat from the emulsifier to and upon the upper delivery run of the conveyor belt.

Referring now more specifically to the drawings, which are illustrative of a preferred form of the apparatus as constructed in accordance with the principles of the present invention, it will be observed that the conveyor mechanism, designated generally by the reference numeral 10, is suitably mounted upon a supporting frame 11 equipped with roller wheels 12 for shifting it into and out of operative position between a meat emulsifier unit 13 and a storage tank 14 into which the emulsified meat is discharged by way of the conveyor mechanism. The emulsifier unit 13 may be of any conventional type having a hopper 15 into which is fed previously ground meat solids blended with spices and curing liquid, which blended meat mixture is further broken up and emulsified into a paste-like form by suitable grinding means operative within the emulsifier itself. The emulisfied mixture is discharged from the emulisfier through a discharge tube 16 in the form of a continuously extending cylindrical extrusion A of a substantially uniform diameter determined by the discharge outlet of the tube 16.

The conveyor mechanism 10 is normally so positioned in relation to the emulsifier unit 13 that the discharge tube 16 of the latter projects over the material receiving end of the conveyor with its discharge outlet centered between the opposite side edges of the conveyor belt. Since the conveyor belt is substanitally wider than the diameter of the meat extrusion A and since also this extrusion is moist and relatively sticky and thus tends to adhere to the surface of the conveyor belt as it is deposited thereon, the emulsified meat as discharged from the emulsifier unit will be continuously conveyed by the upper run of the conveyor belt away from the emulsifier unit along a rectilinear path centered between the opposite side edges of the belt to the discharge end of the conveyor belt from whence the meat will fall into the storage tank 14. This feature of maintaining the meat extrusion A centered between and spaced from the opposite side edges of the conveyor belt is of great importance as will be apparent hereinafter.

The storage vat or tank 14 is, of course, positioned so that the discharge end of the conveyor overhangs a side wall of the tank as shown most clearly in FIG. 1. Depending upon the height of a given tank installation, the conveyor mechanism 10 may be of any desired inclination. While FIG. 1 shows the conveyor mechanism as having a fixed inclination as determined by its supporting structure, it is within the contemplation of this invention is to provide the conveyor with a supporting structure which is adjustable to vary as desired the inclination of the conveyor so as to adapt it for use with storage tanks of varying heights.

The conveyor mechanism 10 will now be described. As best showin in FIGS. 1, 2, 3 and 8, this mechanism includes an endless belt 17 fitted within and about a support 18 which is substantially coextensive in length with the belt and cmprises a main upwardly inclined section 19 having respectively attached to the opposite side of its rear end a pair of slide members 20—20. The main support section 19 is in the form of an inverted channel 21 having opposite parallel side walls 22—22 and a bridging top wall 23 the central portion of which is depressed to form therein a guide channel 24 for the upper run of the conveyor belt 17. Secured to each of the inverted channel side walls 22—22 at the rear ends thereof is an outwardly facing channel 25 within which is slidably received one of the beforementioned slide members 20—20 each of which is held in its slide channel 25 by a cover member 26 welded or otherwise secured to the latter, as by the welds 27.

The conveyor belt, which is of endless construction may be formed of any suitably flexible and tough non-stretchable material which is of a non-toxic composition approved by the Food and Drug Administration as being suitable for use in direct contact with food products and which is impervious to meat fats, which material may be of metal, such as stainless steel or of a natural rubber of synthetic plastic or rubber composition. In some instances, if desired, the conveying surface of the belt amy be coated with a non-toxic, chemically inert food quality composition such as TEFLON which freely releases the meat from the belt at the discharge end thereof.

The opposite ends of the conveyor belt 17 are respectively trained about a tower roller 28 suitably journalled between the front end portions of the side walls 22—22 the main support section for the belt and an upper roller 29 suitable journalled between the rear end portions of the slide members 20—20, the arrangement being such that as the belt 17 travels about its said rollers 28 and 29 the intervening upper run of the belt is supported by and rides along the base wall 23 of the belt guide channel 24. At the same time, the intervening bottom run of the belt is supported against undue flexing by a pair of spaced parallel rollers 30—30 suitably journalled between the depending side walls 22—22 of the main section 19 of the belt support.

The discharge tube 16 of the emulsifier unit 13 is preferably provided at its outer end with means for firmly supporting it in correct axial alinement with the conveyor belt 17, which means preferably consists of supporting legs 31 extending downwardly and outwardly from opposite sides of the tube and terminating in right angular locator pads 32 designed to rest upon the raised opposite wall portions of the belt guide channel 24 for the upper run of the belt 17. It will be observed that these locator pads 32—32 are relatively so disposed and oriented as to automatically aline the emulsifier discharge tube 16 with the longitudinally extending center line of the conveyor belt when the conveyor mechanism is moved into operative association with the emulsifier unit.

The conveyor belt 17 is driven by an electrical motor and gear box drive mechanism 33 suitably mounted upon the main support frame of the conveyor mechanism as shown in FIG. 1, which drive mechanism is sitably connected by a drive chain 34 to the shaft of the lower belt roller 28 which thus serves to drive the belt.

Suitable means are provided for maintaining the conveyor belt 17 under proper tension and for releasing the tension thereof when and as it is necessary so to do. A preferred construction of such tensioning means is shown in FIG. 2 wherein it will be observed that the hereinafter mentioned fixed cover members 26—26 for the rear slide members 20—20 are each provided with an apertured boss 35 through which slidably projects a rod 36. the rods 36—36 which are both disposed in a common plane paralleling the plane of movement of the conveyor belt 17, each have their front ends connected, as by a pivotally connected link 37, to a toggle lever 38 pivoted, as at 39, to the fixed member 26. The opposite rear end of each rod 36 is provided with an axially slidable threaded rod 40 having a nut 41 threaded thereon for adjustable engagement with said rod 36 and with a headed end 42 secured to a lug 43 fixedly secured to each slide member 20. the toggle linkage is such that when the lever 38 is swung from its dashed line to its full line position shown in FIG. 2, it passes dead center and automatically remains locked in said full line position. Adjustment of the nut 41 on the rod 40 relatively to the rod 36 varies the effective combined length of the rods 36 and 40 so that upon increasing such length the belt tension may be increased as desired. Once the desired belt tension has been achieved by actuation of the toggle lever into its full line position, it may be quickly relieved by swinging the toggle lever into its dashed position shown in FIG. 2.

A most important feature of the present invention is the provision of means at the upper end of the conveyor mechanism for scraping the return run of the conveyor belt free of any residue thereon the material conveyed for discharged into the storage tank, as well as to prevent lateral spread on the belt of the material which might remain adhered to the under surface of the belt in the region thereof immediately adjacent the upper bight end of the belt from which the material is discharged into the storage vesel 14.

As is best shown in FIGS. 2 and 4 to 7 inclusive, the last-mentioned means essentially comprises a belt scraper assembly 44 (see FIG. 7) which includes a rigid, inflexible V-shaped backing member 45 extending transversely across the bottom run of the belt 17 adjacent the upper end thereof, which member 45 is provided at its opposite ends with mounting tabs 46—46 respectively secured to means to be described for releasably supporting the scraper assembly operatively with respect to the conveyor belt. This scraper assembly 44 is located in close relation to the upper rolelr 29 for the conveyor belt and is oriented with its apex presenting away from said roller so that any material which remains stuck to the belt beyond its discharge point will be directed inwardly toward the longitudinal center line of the belt and away from its opposite side edges.

The scaper backing member 45 is lined on its upstream side with any suitable semi-flexible, tough and smooth material 47 as will effectively scrape from the conveyor belt for discharge into the storage vessle 14 any residue of material remaining on the belt as it passes around its upper roller 29. This liner material 47 may be the same as that used for the belt itself and is preferably detachably secured, as by the bolts 48, to the member 44 so that upon wear thereof it may be replaced as needed.

The upper edge of the scraper liner 47 is releasably held in frictional contact with the under surface of the bottom run of the conveyor belt by identical means provided at opposite sides of the conveyor belts as best shown in FIGS. 2, 4 and 5. This means, of which only one set is described in detail, includes a lever arm 49 pivoted, as at 50, to the outer side of the free end of the slide member 20, the lower end of which arm 49 is rigidly connected, as by the bolt 51, to one of the end mounting tabs 46 of the scraper assembly. The opposite upper end of the arm 49 is provided with an outwardly projecting pad 52.

Also secured rigidly to the outer surface of the slide member 20, as by the bolts 53—53 is a clevis member 54 having a short rigid arm 55 and a second longer arm 56 pivoted within the clevis, as at 57. Both of the arms 55 and 56 are approximately parallel to one another and to the lever arm 94, all three of which arms are disposed in a substantially common vertical plane.

Pivoted to the short rigid arm 55, as at 58, is a substantially vertically extending yoke member 59 which freely embraces the uppermost pivoted arm 56 and is provided with a transversely extending detent 60 which is adapted to ride into and out of a detent notch 61 formed in the upper edge of the pivoted arm 56. The free end of this latter arm is fitted with an axially adjustable threaded stud 62 having a base 63 which engages the pad 52 of the scraper lever arm 49. It will be apparent that when the yoke 59 is swung into its detained full line position shown in FIG. 4, the clevis - pivoted arm 56 will have been swung clock-wise and, through interventions of the threaded stud 62, will cause the lever arm 49 to swing clock-wise (as viewed in FIG. 4) about its pivot 50 and force the belt scrape assembly 44 upwardly against the lower run of the conveyor belt at the point immediately adjacent the upper roller of the conveyor mechanism. In this upwardly-urged position of the scraper assembly, the top edge of the scraper liner 47 will be in close frictional engagement with the under surface of the return run of the conveyor belt across the full width of the latter. Also, when so urged in belt-scraping position, the scraper assembly will tend to flex the belt more or less tautly about the upper roller and thereby increase somewhat the tension of the belt.

Since the scraper assembly is located at an elevated point within and above the top edge of the storage vessel, it will be apparent that all of the material which may be carried around the upper bight of the belt to the scraper assembly will be scraped free of the belt and discharged into the storage vessel. Thus, the undersurface of the return run of the belt is continuously returned to the meat receiving end of the conveyor free and clean of adhering meat where it is constantly in surface-clean shape for receiving the extrusion A of meat deposited thereon through the discharge tube of the emulsifier unit.

In this latter connection, it is of importance to note that the V-shape of the scraper assembly also serves to prevent lateral spread of the meat toward and around the side edges of the belt, therby preventing the build-up of meat debris upon the inner surfaces of the belt and rendering it easy to keep immaculately clean.

When it is necessary to service the apparatus, as to clean or replace the belt or scraper liner 47, the belt tension is released by actuation of the belt tensioning toggle lever 38—38 into the dashed line position shown in FIG. 4, while the scraper assembly is released from its operative engagement with the belt by shifting the yokes 59—59 in the directions indicated by the arrow in FIG. 4 to thereby permit the scraper assembly under its own weight to drop out of engagement with the belt.

It will be understood that the present invention is susceptible of various changes and modifications which may be made from time to time without departing from the general principles or real spirit of the invention and it is accordingly intended to claim the same broadly, as well as specifically, as indicated by the appended claims.

What is claimed as new and useful is:

1. In an apparatus for processing sausage and like meat products, in combination, an emulsifier for producing and directly discharging therefrom an unconfined blended mixture of said product in the form of a continuous paste-like extrusion of predetermined diameter, a conveying mechanism having a continuously moving endless belt having an upper conveying surface onto which said extrusion in its unconfined condition is continuously deposited and moved to a processing station remote from said emulsifier, said conveyor belt being of a transverse width substantially greater than the transverse dimension of said extrusion, means for effecting deposit of said continuous paste-like extrusion of meat directly from said emulsifier onto the central portion of the conveying run of the belt at the receiving end thereof for uninterrupted conveyance of the meat extrusion along the longitudinal center line of said conveyor belt in substantial spaced relation to the opposite side edges of the belt, said last mentioned means including a relatively short discharge outlet extending from said emulsifier in overlying relation to the receiving end of said conveyor belt with its discharge axis disposed in the vertical plane of the longitudinally extending center line of said belt, and scraper means engaging the bottom return surface of the conveyor belt immediately adjacent the discharge end thereof for directing any residue of the conveyed product adhering to said conveyor belt at said discharge end toward the center of said bottom return surface of the belt whereby to maintain said latter surface free of any accumulated deposit thereon of the emulsified meat product, said scraper means including a scraper extending transversely across and engaging substantially the full width of the bottom return surface of the belt, said scraper being V-shaped and disposed with its apex presenting toward and in line with said emulsifier outlet whereby any residue of the conveyed product adhering to said conveyor belt at the discharge end thereof is directed as aforesaid toward the center of the bottom return surface of the belt for discharge therefrom into a storage vessel disposed beneath the discharge end of the conveyor mechanism.

2. In an apparatus as defined in claim 1 wherein said emulsifier outlet is in the form of a cylindrical tube having means adapted to removably engage fixed structural elements of the conveying mechanism for insuring longitudinal alinement of said tube with said center line of the belt.

3. In an apparatus as defined in claim 1 wherein said scraper means includes a main support member of rigid material and a liner of semi-rigid material replaceably secured to said support member, the liner having a top portion projection freely above said support member for frictional contact with the bottom return surface of the belt.

4. In an apparatus as defined in claim 1 including means for releasably supporting said scraper means in frictional engagement with the return run of the conveyor belt.

5. In an apparatus as defined in claim 4 wherein said supporting means for said scraper means includes a lever system at each side of the scraper means for operating the latter, each said lever system including first and second lever arms respectively pivoted to the conveyor belt supporting frame, said first arm having one end portion thereof rigidly secured to one side of said scraper means and said second arm having an adjustable extension operative upon the opposite end portion of said first arm to releasably swing the scraper means into scraping contact with the conveyor belt, and a yoke member operative to releasably hold said scraper means in belt-scraping position.

6. In an apparatus as defined in claim 5 wherein said yoke member pivotally embraces said second arm for actuation thereof and wherein said yoke member and second arm respectively include coacting detent means for releasably locking said lever system in belt-scraping condition position.

* * * * *